(12) United States Patent
Mahto

(10) Patent No.: US 12,182,720 B2
(45) Date of Patent: Dec. 31, 2024

(54) PATTERN RECOGNITION APPARATUS, PATTERN RECOGNITION METHOD, AND COMPUTER-READABLE RECORDING MEDIUM

(71) Applicant: NEC Corporation, Tokyo (JP)

(72) Inventor: Shivangi Mahto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1127 days.

(21) Appl. No.: 17/044,399

(22) PCT Filed: Jun. 29, 2018

(86) PCT No.: PCT/JP2018/024932
§ 371 (c)(1),
(2) Date: Oct. 1, 2020

(87) PCT Pub. No.: WO2020/003533
PCT Pub. Date: Jan. 2, 2020

(65) Prior Publication Data
US 2021/0117733 A1    Apr. 22, 2021

(51) Int. Cl.
*G06N 3/0475*        (2023.01)
*G06F 18/10*         (2023.01)
(Continued)

(52) U.S. Cl.
CPC ............. *G06N 3/088* (2013.01); *G06F 18/10* (2023.01); *G06F 18/2132* (2023.01);
(Continued)

(58) Field of Classification Search
CPC ........ G06N 3/088; G06N 3/045; G06N 3/047; G06N 3/0475; G06N 3/094; G06N 20/10;
(Continued)

(56) References Cited

U.S. PATENT DOCUMENTS

2018/0114096 A1    4/2018  Sen et al.
2018/0293713 A1*  10/2018  Vogels ..................... G06N 3/04
(Continued)

FOREIGN PATENT DOCUMENTS

WO        2018/078712 A1    5/2018

OTHER PUBLICATIONS

Goodfellow et al "Generative Adversarial Nets" retrieved from https://arxiv.org/abs/1406.2661 (Year: 2014).*
(Continued)

*Primary Examiner* — Sanchita Roy

(57) ABSTRACT

An apparatus for pattern recognition includes a generator which transforms noisy feature vectors into denoised feature vectors, a discriminator which takes the denoised feature vectors and the original clean feature vectors corresponding to the denoised feature vectors as input and predicts probability for both of the input features of being an original clean feature, classifies the input feature vectors into its corresponding classes, an objective function calculator which calculates generator and discriminator losses using the denoised feature vectors, the clean feature vectors from which the noisy feature vectors have been made, the estimated classes and their true classes, and a Parameter updater which updates parameters of the generator and the discriminator according to loss minimization.

19 Claims, 11 Drawing Sheets

(51) Int. Cl.
  *G06F 18/21* (2023.01)
  *G06F 18/2132* (2023.01)
  *G06F 18/2411* (2023.01)
  *G06F 18/2415* (2023.01)
  *G06N 3/045* (2023.01)
  *G06N 3/047* (2023.01)
  *G06N 3/088* (2023.01)
  *G06N 3/094* (2023.01)

(52) U.S. Cl.
  CPC ...... *G06F 18/2193* (2023.01); *G06F 18/2411* (2023.01); *G06F 18/2415* (2023.01); *G06N 3/045* (2023.01); *G06N 3/047* (2023.01); *G06N 3/0475* (2023.01); *G06N 3/094* (2023.01)

(58) Field of Classification Search
  CPC ............. G06F 18/2132; G06F 18/2193; G06F 18/2411; G06F 18/2415; G06F 18/10; G06F 18/21343; G06F 18/2185; G06F 18/24133; G10L 17/04; G10L 17/18; G10L 17/20
  See application file for complete search history.

(56) References Cited

U.S. PATENT DOCUMENTS

2020/0294201 A1* 9/2020 Planche .............. G06F 18/2413
2020/0380673 A1* 12/2020 Wang .................... G06V 10/82

OTHER PUBLICATIONS

Yang et al "LR-GAN: Layered Recursive Generative Adversarial Networks for Image Generation" retrieved from https://arxiv.org/pdf/1703.01560 and dated Aug. 2017 (Year: 2017).*
International Search Report for PCT Application No. PCT/JP2018/024932, mailed on Sep. 18, 2018.
English translation of Written opinion for PCT Application No. PCT/JP2018/024932, mailed on Sep. 18, 2018.
Jelmer M. Wolterink et al., "Generative Adversarial Networks for Noise Reduction in Low-Dose CT", Proceedings of IEEE Transactions on Medical Imaging, IEEE [online], May 26, 2017[retrieved on Aug. 8, 2018], Retrieved from the Internet: <URL: https://ieeexplore.ieee.org/document/7934380>, pp. 2536-2545, USA.

* cited by examiner

Training Stage

Test Stage

PATTERN RECOGNITION APPARATUS, PATTERN RECOGNITION METHOD, AND COMPUTER-READABLE RECORDING MEDIUM

This application is a National Stage Entry of PCT/JP2018/024932 filed on Jun. 29, 2018, the contents of all of which are incorporated herein by reference, in their entirety.

TECHNICAL FIELD

The present invention relates to a pattern recognition apparatus and a pattern recognition method for improving accuracy of a pattern recognition system, for e.g. face recognition and speaker verification, and also to a computer-readable recording medium having recorded thereon a pattern recognition program for realizing the apparatus or the method.

BACKGROUND ART

Pattern recognition has been widely used in various spheres of life including day-to-day applications such as security, surveillance and e-commerce as well as technological applications such as agriculture, engineering, science and high profile issues like military and national security.

Processes of a pattern recognition system can be broadly categorized into two steps: The first is feature extraction to extract features of the input signal and the second is classification to classify the extracted features into a class (classes) corresponding to the input signals.

The pattern recognition system learns features corresponding to the classes and trains its classifier using learnt features. For better pattern recognition, features corresponding to a class should have class-related similarities and features corresponding to different classes should be as dissimilar as possible. In technical terms, we can say features corresponding to the same classes should have low variance called as within class covariance and features belonging to different patterns should have large variance called as between class variance. Also, the features should follow the statistical distribution assumed by the classifier for classification purpose. For example, linear discriminant analysis classifier assumes that features belonging to each class follow Gaussian distribution.

In real world scenarios noise, e.g. background noise, short duration of the signal and channel distortion, often affects performance of feature extraction and classification processes. Due to variety of noise, features can get corrupted and the expected property of features of following a prior distribution as well as having smaller ratio of within-class variance to between-class variance cannot be satisfied.

One approach to keep the above mentioned expected property of features in a pattern recognition apparatus is to apply a feature transformation block to handle generalized unwanted variability in features introduced by noise or other external factors. The block is desired to make within class variance or covariance in multi-dimensional cases as small as possible relative to between class covariance by transforming features into another feature space. It is expected to inculcate class-related statistical similarities in features of same class along with explicitly preserving the statistical distribution of features after transformation.

To handle the problem of increased within class variance and/or decreased between class variance in the feature space due to distortion in input signal caused by noise, a feature transformation has been applied to the extracted features before classification. The transformation has following properties:

1. It boosts the class-related similarities in the transformed features.

2. It explicitly preserves the statistical distribution of the features in transformed space 3. It maintains discriminative ability of features that is small within class variance of features relative to between class variance.

4. It is designed to be applied to a wide range of unwanted variability.

Linear discriminant analysis has been a well-known classical approach to make within class variance smaller by feature transformation. Some new methods for feature transformation focus on either minimizing within class covariance or maximizing between class covariance using neural networks.

A prior art for this method is disclosed in PTL1 as shown in FIG. 11. The prior art deals with feature compensation has been disclosed in PTL 1.

As shown in FIG. 11, Feature transformer 91 is a denoising autoencoder which takes noisy features (y) as input and transforms them into denoised features (z) and also estimates their class labels (l). Objective function calculator 92 reads clean features (x), denoised features (z), original labels of the input feature (o) and estimated class labels by classifier (l). It calculates cost 923 of transformation as weighted average of mean square error 921 between denoised features (z) and clean features (x) and classification error 922 between original labels (l) and estimated class labels (o).

Parameter updater 94 updates the parameters of the discriminative denoising autoencoder according to minimization of the cost function. This process keeps going till convergence. After convergence of the algorithm, parameter updater stores the parameters and structure of the discriminative denoising autoencoder in storage 95. In testing phase, feature transformer 91 reads the structure and parameters of the trained denoising autoencoder 91, reads input test vectors, processes them and outputs denoised features.

The method disclosed in PTL1 focuses on discriminatively denoising of feature vectors using a Denoising auto encoder by minimizing within class covariance of features using mean square error and inculcating discriminability by minimizing classification error.

Above described method aim to minimize within class covariance by minimizing mean square error between denoised and clean features. Such learning only emphasizes on the overall average error across all the dimensions of the features, ignoring the fact that may be one dimension of the feature may weight more than the other for the classifier to discriminate between different classes. The learning using MSE-based similarity limits the feature transformer network to just learn dissimilarity in Euclidean space which may be helpful for classifiers which directly uses Euclidean distance as the similarity measure such as cosine similarity.

However, this may not get best features for classifiers which focusses on latent class-dependent factors of the features. This leads to sub-optimal learning of features leading to a worse classification accuracy. A summary of the technical challenges and the solution provided by the inventive technique will be represented next.

CITATION LIST

Patent Literature

PTL 1

WO2018/078712A1

SUMMARY OF INVENTION

Technical Problem

To handle distortion in input signals, a noise robust pattern recognition system is very important. Distortion in input signal due to noise and other factors can cause large within class covariance relative to between class covariance in feature space which results in worse pattern recognition accuracy. One of the important properties of features for good pattern recognition is to have small within class covariance relative to between class covariance. Features belonging to same class should have high statistical class-based similarity rather than just being deterministically similar.

To handle the problem of maintaining within class covariance small relative to between class covariance for noisy input signal, we can transform extracted noisy features to another space with the emphasis on minimizing within class covariance and maximizing between class covariance simultaneously.

Although there exist approaches in literature for feature transformation [PTL 1], which try to solve the problem but they also suffer from some drawbacks as follows. It tries to minimize within class covariance by minimizing mean square error between transformed noisy and corresponding clean features. Such minimization averages out error across all dimensions of the features and hence does not focus on optimizing the class-based similarity in transformed features. Such learning lacks in inculcating high statistical class-based similarity in transformed and thus results in sub-optimal feature learning.

In addition to the entities mentioned above, other apparent and obvious drawbacks that this invention can overcome will be revealed from the detailed specification and drawings.

Solution to Problem

The purpose of the present invention is, for example, to present a feature transformation block in a pattern recognition system with the properties of maintaining class-oriented similarity in transformed features so as to minimize within-class covariance and maximize between-class covariance.

In order to achieve the foregoing object, a pattern recognition apparatus according to one aspect of the present invention includes:
a generator that transforms noisy feature vectors into denoised feature vectors;
a discriminator that takes the denoised feature vectors and the original clean feature vectors corresponding to the denoised feature vectors as input and predicts probability for both of the input features for being an original clean feature, and classifies the input feature vectors into its corresponding classes;
an objective function calculator that calculates generator and discriminator losses using the denoised feature vectors, the clean feature vectors from which the noisy feature vectors have been made, the estimated classes and their true classes wherein the generator loss comprises 1. GAN-based loss, 2. Classification loss, 3. Class-oriented dissimilarity loss, and the discriminator loss comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and
a parameter updater that updates parameters of the generator and the discriminator according to loss minimization.

In order to achieve the foregoing object, a pattern recognition method according to another aspect of the present invention includes:
(a) a step of transforming noisy feature vectors into denoised feature vectors;
(b) a step of taking the denoised feature vectors and the original clean feature vectors corresponding to the denoised feature vectors as input and predicting probability for both of the input features for being an original clean feature, and classifying the input feature vectors into its corresponding classes;
(c) a step of calculating losses of the step (a) and step (b) using the denoised feature vectors, the clean feature vectors from which the noisy feature vectors have been made, the estimated classes and their true classes wherein the loss of the step (a) comprises 1. GAN-based loss, 2. Classification loss, 3. Class-oriented dissimilarity loss, and the loss of the step (b) comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and
(d) a step of updating parameters of the step (a) and the step (b) according to loss minimization.

In order to achieve the foregoing object, a computer-readable recording medium according to still another aspect of the present invention has recorded therein a program, and the program includes an instruction to cause the computer to execute:
(a) a step of transforming noisy feature vectors into denoised feature vectors;
(b) a step of taking the denoised feature vectors and the original clean feature vectors corresponding to the denoised feature vectors as input and predicting probability for both of the input features for being an original clean feature, and classifying the input feature vectors into its corresponding classes;
(c) a step of calculating losses of the step (a) and step (b) using the denoised feature vectors, the clean feature vectors from which the noisy feature vectors have been made, the estimated classes and their true classes wherein the loss of the step (a) comprises 1. GAN-based loss, 2. Classification loss, 3. Class-oriented dissimilarity loss, and the loss of the step (b) comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and (d) a step of updating parameters of the step (a) and the step (b) according to loss minimization.

Advantageous Effects of Invention

As described above, according to the present invention, it is possible to present a feature transformation block in a pattern recognition system with the properties of maintaining class-oriented similarity in transformed features so as to minimize within-class covariance and maximize between-class covariance.

BRIEF DESCRIPTION OF DRAWINGS

The drawings together with the detailed description, serve to explain the principles for the inventive method. The drawings are for illustration and do not limit the application of the technique.

DESCRIPTION OF EMBODIMENTS

Principle of the Invention

Figure 1:
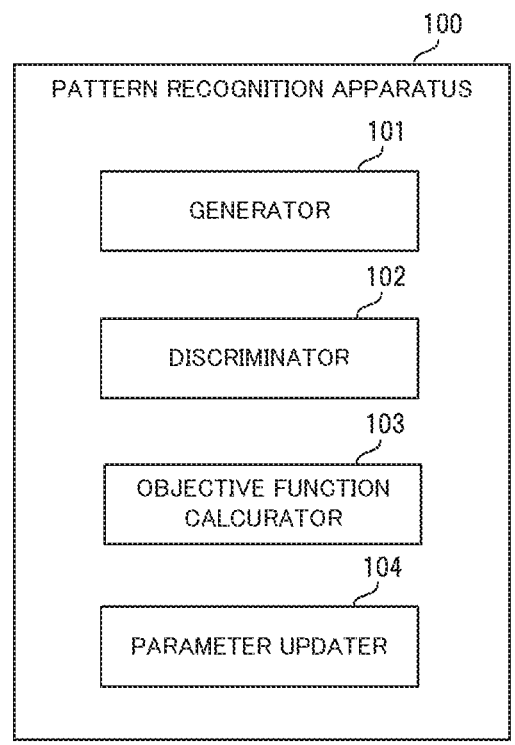
FIG. 1 is a block diagram showing the schematic configuration of the pattern recognition according to the first embodiment of the present invention.

A summary of the solution to all above problems is provided next. To solve the technical problems discussed above an overall approach is summarized here. There are two stages in the approach as a training stage and a testing stage.

In the training stage, we first train a pattern recognition system using training data. In test stage, we use the feature transformation block of the trained system for transforming unseen test data to extract robust features. In training stage, a GAN (Generative Adversarial Network) comprising a generator and a discriminator are trained using noisy features, corresponding clean features and their class labels. Generator and discriminator are trained alternatively in such a way that they fool each other.

Generator reads noisy feature and estimates denoised feature. Discriminator reads the output of generator as input and predicts the probability of it being an originally clean feature vector and also estimates its class label predicts.

Then, the discriminator reads the corresponding originally clean feature as input and predicts the probability of it being an originally clean feature vector and also estimates its class label predicts. Objective function calculator reads outputs of discriminator and the ground truth class labels of the input feature vectors and calculates discriminator loss.

Then the parameter updater updates the parameters of the discriminator to optimize the objection function. This parameter updating of discriminator goes on for a sufficient number of iterations. After which the objective function calculator reads outputs of discriminator and the ground truth class labels and clean features corresponding to the input feature vectors and calculates generator loss.

Then parameter updater updates the parameters of generator to optimize objection function. This loop of alternate training of discriminator and generator goes on till the convergence of the generator loss. After convergence, parameter updater stores the parameters of generator to be used for evaluation purpose.

Our main contribution is in the designing of the generator loss. Apart from the usual adversarial GAN loss and classification loss, the generator in our method focuses on minimizing class-oriented dissimilarity that is the negative log likelihood ratio based on PLDA between features belonging to same class and maximizes the dissimilarity for features belonging to different classes. PLDA is a probabilistic linear discriminant analysis trained beforehand on the clean data.

In secondary embodiment, along with PLDA-based dissimilarity measure, we also add another cost function to the generator loss for explicitly preserving probabilistic distribution of the bottle-neck-features of the generator by applying KL divergence regularizer.

For primary embodiment, in test stage, generator reads stored trained structure and its parameters. It receives test features and outputs corresponding denoised features. In test stage of secondary embodiment, the bottle-neck-features of the generator is taken as the transformed denoised features for a given input test feature vector.

An advantage of the invention is that we get a trained feature transformation block with the desired properties of features as follows:

1. The transformed features have class-oriented similarity which helps in achieving better classification accuracy.

2. The transformed features are widely noise-robust as the block is trained to remove a wide variety of noise.

The training of GAN with the newly introduced functions in generator loss that is class-oriented dissimilarity contributes to have small within class covariance and large between class covariance simultaneously which will be helpful for classification.

The invention accordingly comprises of several steps and the relation of one or more of these steps with respect to each of the others, and the apparatus embodying the features of construction, combinations of elements and arrangement of parts that are adapted to affect such steps, all will be exemplified in the following detailed disclosure, i.e. description of drawings and detailed description. The scope of the invention will be indicated in the claims.

Hereinafter, exemplary embodiments of the present invention will be described in detail. The implementations are described in complete detail. Along with the illustrative drawings, the explanation provided here is so as to provide a solid guide to a person skilled in the art to practice this invention.

First Embodiment

At first, a pattern recognition apparatus, a pattern recognition method, and a pattern recognition program of a first embodiment of the present invention will be described with reference to FIGS. 1 to 5.

Device Configuration

First, the pattern recognition apparatus of the first embodiment will be described with FIG. 1. FIG. 1 is a block diagram showing the schematic configuration of the pattern recognition according to the first embodiment of the present invention.

A pattern recognition apparatus 100 of the first embodiment shown in FIG. 1 is apparatus for pattern recognition using neural network-based feature transformation. As shown in FIG. 1, the pattern recognition apparatus 100 of the first embodiment includes a generator 101, a discriminator 102, an objective function calculator 103, and a parameter updater 104. The generator 101 transforms noisy feature vectors into denoised feature vectors.

The discriminator 102 takes the denoised feature vectors and the original clean feature vectors corresponding to the denoised feature vectors as input. The discriminator predicts probability for both of the input features for being an original clean feature. The discriminator classifies the input feature vectors into its corresponding classes.

The objective function calculator 103 calculates generator and discriminator losses using the denoised feature vectors, the clean feature vectors from which the noisy feature vectors have been made, the estimated classes and their true classes. The generator loss comprises 1. GAN-based loss, 2. Classification loss, 3. Class-oriented dissimilarity loss. The discriminator loss comprises 1. GAN-based loss and 2. Classification loss.

The GAN-based loss is calculated with the output probability predicted by the discriminator for the input feature vector to be an originally clean feature vector. The class-oriented dissimilarity loss is the dissimilarity between denoised feature vector produced by the generator and the corresponding clean features measured using pre-trained PLDA-based-scoring. The classification loss is the prediction error between the estimated class label and corresponding ground truth.

The parameter updater 104 updates parameters of the generator and the discriminator according to loss minimization.

In this way, with the pattern recognition apparatus 10, a generator loss and a discriminator loss are calculated, parameters of the generator and the discriminator are updated to minimize losses. For this reason, it is possible to present a feature transformation block in a pattern recognition system with the properties of maintaining class-oriented similarity in transformed features so as to minimize within-class covariance and maximize between-class covariance.

Next, the configuration of the pattern recognition apparatus 100 of the first embodiment will be described in detail with reference to FIGS. 2 to 7 as well.

Figure 2:
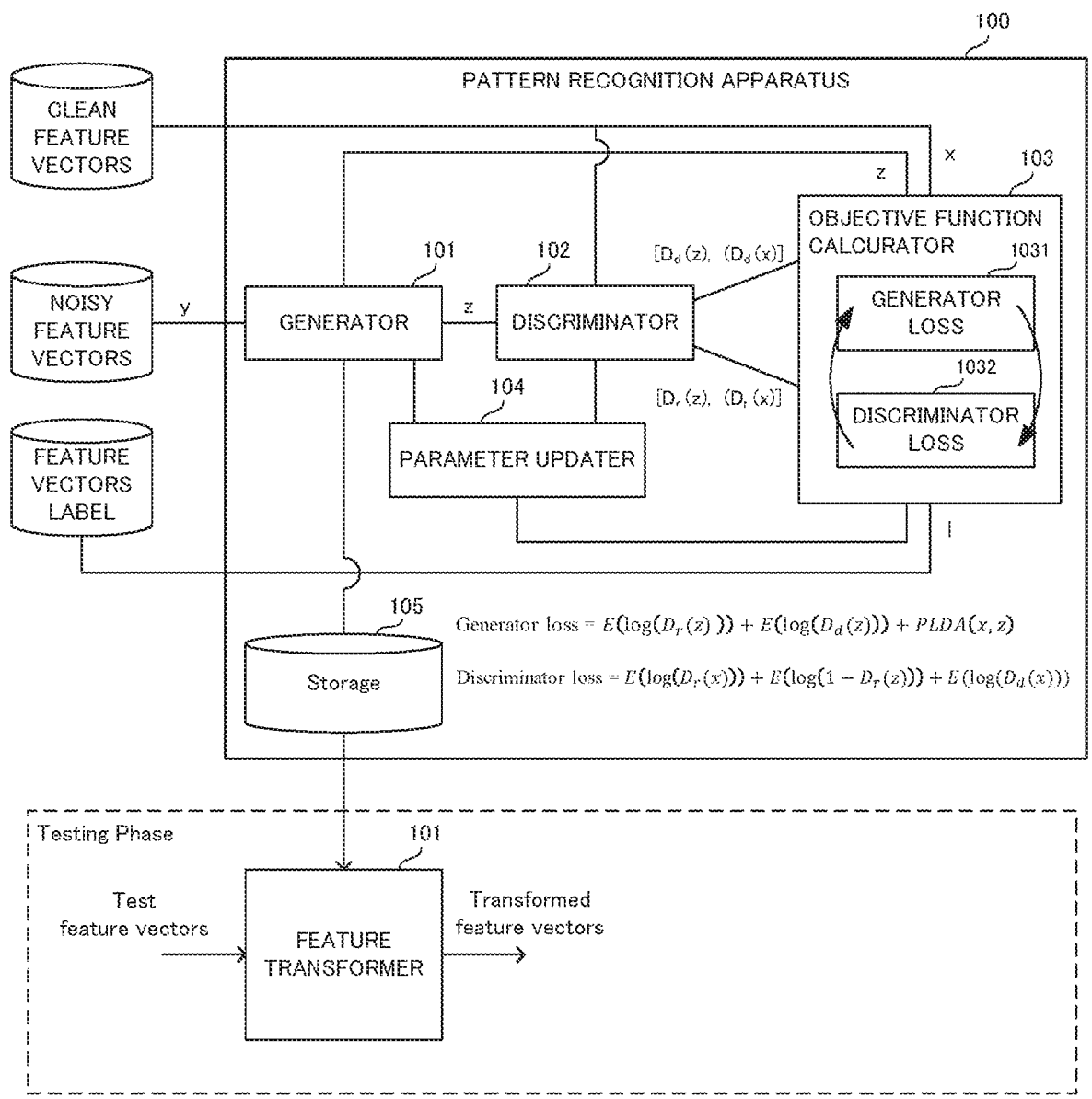
FIG. 2 illustrates a block diagram showing the specific configuration of the pattern recognition apparatus according to the first embodiment of the present invention.

FIG. 2 illustrates a block diagram showing the specific configuration of the pattern recognition apparatus according to the first embodiment of the present invention. According to FIG. 2, Objective function calculator 103 calculates generator loss 1031 while training the generator and calculates discriminator loss while training the discriminator. The pattern recognition apparatus further includes a storage 105 of parameters and structures of generator and trained generator 101 in transformation phase, in addition to the generator 101, the discriminator 102, the objective function calculator 103, and the parameter updater 104.

In the training phase, the generator 101 reads noisy features (y) and estimates denoised features (z). Then, the discriminator 102 reads denoised features (z) and predicts the probability of it being an originally clean feature vector ($D_r(z)$) and also estimates its class label ($D_d(z)$). Then, the discriminator 102 reads original clean features (x) and predicts the probability of it being an originally clean feature vector ($D_r(x)$) and also estimates its class label ($D_d(x)$)

Objective function calculator 103 reads outputs of discriminator ($D_r(x)$, $D_r(z)$ and ($D_d(x)$, $D_d(z)$) and the ground truth class labels (l) of the input feature vectors and calculates discriminator loss 1032. The mathematical composition of discriminator loss for the primary embodiment is expression 1.

$$\text{Discriminator loss} = -E(\log(D_r(x))) - E(\log(1-D_r(z))) - E(\log(D_d(x))) \quad \text{[Expression 1]}$$

The parameter updater 104 updates parameter of discriminator to optimize objection function. This training of discriminator goes on for a sufficient number of iterations. After the training of discriminator, the generator 101 reads the noisy features and estimates denoised features. Then, discriminator 102 reads denoised features (y) and predicts the probability of it being an originally clean feature vector ($D_r(z)$) and also estimates its class label ($D_d(z)$).

The objective function calculator 103 reads outputs of discriminator ($D_r(z)$) and ($D_d(z)$) and the ground truth class labels (l, x) of the input feature vectors and calculates generator loss 1033. The mathematical composition of generator loss for the primary embodiment is expression 2.

$$\text{Generator loss} = -E(\log(D_r(z))) - E(\log(D_d(z))) - \text{PLDA}(x,z) \quad \text{[Expression 2]}$$

In expression 2, PLDA represents a trained PLDA on clean data and PLDA (x,z) represents output score of PLDA for the test pair of (x,z). Parameter updater 104 updates parameter of generator to optimize objection function. The training of generator and discriminator goes on until convergence of generator loss.

After the convergence, parameter updater stores parameters of the trained feature transformer in storage 105. In the testing phase, generator 101 reads its stored structure and parameters from the storage 105. It reads testing features as input and produces denoised features as output.

In the case of face recognition, classes are personal IDs and feature vectors are coordinates of eyes, nose and so on. If the images to be recognized are blurred while the recognition system is trained on clean images then these pictures will not be recognized properly. These blurred images would produce noisy features in feature space as compared to the features extracted from clean images which were used for training of pattern recognition system. Generator 101 reads the noisy features corresponding to blurred images and produces denoised features.

In the case of speaker recognition, classes are also personal IDs of speakers and feature vectors are i-vectors which are extracted from phonemes included in speech signals, as shown in the following reference document. When the system is applied to the audios recorded in a noisy environment, the systems reads noisy i-vectors as features of the speaker whereas the system is trained on clean i-vectors extracted from clean audio signals. Generator 101 transforms noisy i-vectors into clean i-vectors which will be further used in the standard pattern recognition system to recognize speakers.

Reference document: Dehak, Najim, et al. "Front-end factor analysis for speaker verification." IEEE Transactions on Audio, Speech, and Language Processing 19.4 (2011): 788-798.

Figure 3:
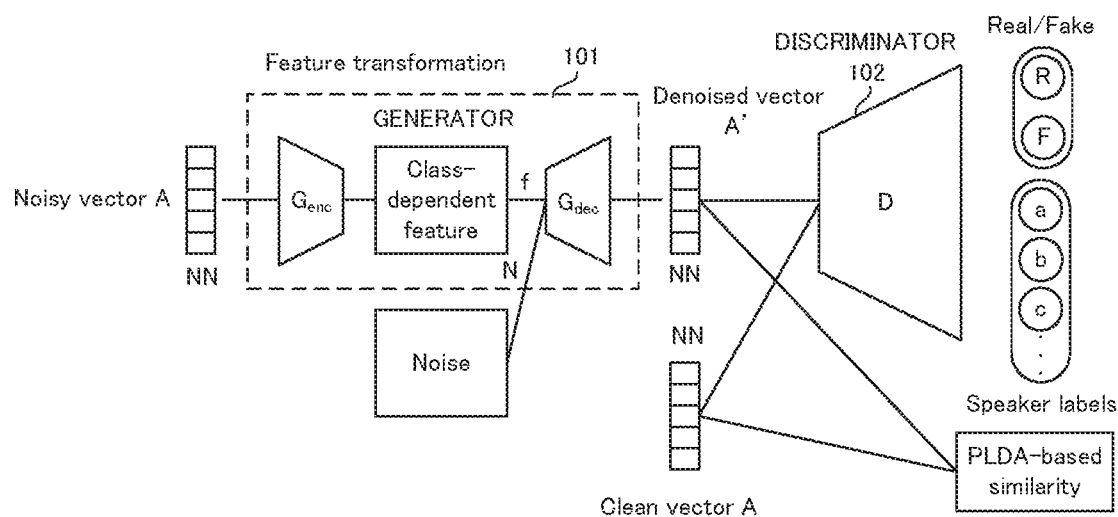
FIG. 3 is a neural network representation illustrating an example of the first embodiment of the present invention in training phase: training a generator and a discriminator.
Figure 3:
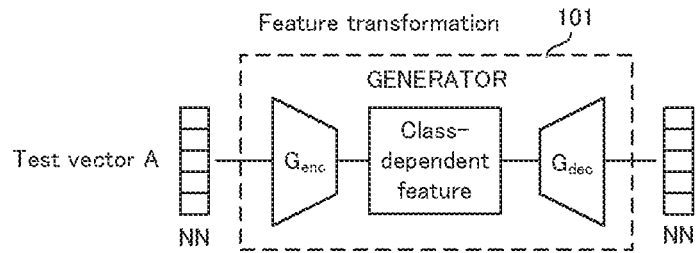

FIG. 3 is a neural network representation illustrating an example of the first embodiment of the present invention in training phase: training a generator and a discriminator. As shown in the FIG. 3, the generator 101 has two neural networks (NNs) as: Encoder ($G_{ene}$) and Decoder ($G_{dec}$). In training stage, $G_{ene}$ reads noisy features as input, encode them into class-dependent features (f), then $G_{dec}$ reads the encoded features (f) and a random noise vector (N) and produces a denoised feature vector A' at output.

The discriminator 102 has one neural network (NN). The discriminator 102 reads the denoised feature vectors (A') and the corresponding clean features (A) and then predicts the probability of each being the originally clean feature vector and estimates the class of each input feature. Also, PLDA similarity is computed between denoised feature vector (A') and the clean feature vector (A) as a measure to find class-oriented similarity between the two features.

Both generator and discriminator neural networks (NNs) are trained alternatively to optimize generator and discriminator losses such that after the training discriminator can correctly classify denoised features into their classes and cannot distinguish between original clean features (A) and denoised features (A').

Also, after training, the PLDA similarity between every training pair of (A, A') is maximum implying that denoised features have class-related properties. After convergence of the training losses of both the generator 101 and the discriminator 102, the trained weight parameters of both the discriminator and generator are stored in the storage 105 as described in the block diagram of first embodiment.

During test stage, the generator 101 reads its trained parameters from the storage 105. $G_{ene}$ reads given test feature vector as input and transforms it to encoded feature vector. Then, $G_{dec}$ reads the encoded feature vector as input and produces denoised representation of the input feature.

This representation shows one of the advantageous effects of first embodiment as:

During training, noise has been added randomly to the encoded features so that the generator learned to remove a wide variety of noise by transformation.

Device Operation

Next, operations performed by the pattern recognition apparatus 100 of the first embodiment will be described with reference to FIG. 4 and FIG. 5. FIGS. 1 to 3 will be referenced as necessary in the following description. Also, in the first embodiment, a pattern recognition method is implemented by causing the pattern recognition apparatus to operate. Accordingly, the following description of operations performed by the pattern recognition apparatus 100 will substitute for a description of the pattern recognition method of the present first embodiment.

Figure 4:
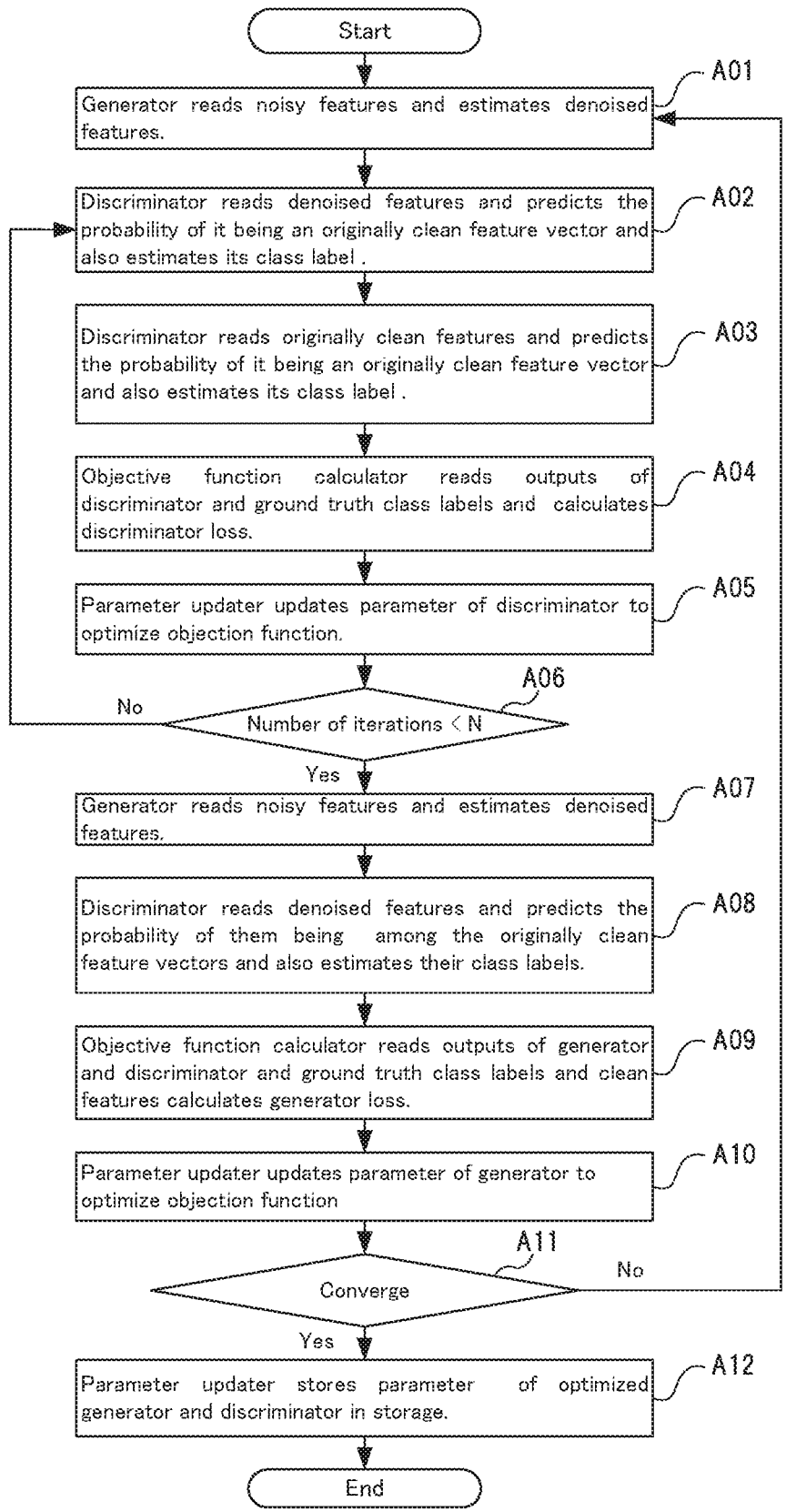
FIG. 4 is a flowchart showing operations performed by the pattern recognition apparatus according to the first embodiment of the present invention.

FIG. 4 is a flowchart showing operations performed by the pattern recognition apparatus according to the first embodiment of the present invention. FIG. 4 shows the training part of the primary embodiment. First, as shown in FIG. 4, in the training phase, the generator 101 reads noisy features and estimates denoised features (step A01). Then, the discriminator 102 reads denoised features and predicts the probability of it being an originally clean feature vector and also estimates its class label (step A02).

Then, the discriminator 102 reads original clean features and predicts the probability of it being an originally clean feature vector and also estimates its class label (step A03). Next, the objective function calculator 103 reads outputs of discriminator and the ground truth class labels of the input feature vectors and calculates discriminator loss (step A04).

Next, the parameter updater 104 updates parameter of discriminator to optimize objection function (step A05). Then, the parameter updater 104 determines whether or not number of iterations are smaller than N (step A06). This training of discriminator goes on for a sufficient number of iterations.

If the result of the determination in step A06 is that the number of iterations are not smaller than N, step A02 will be executed again. However, if the result of the determination in step A06 is that the number of iterations are smaller than N, step A07 will be executed.

After the training of discriminator 102, the generator 101 reads the noisy features and estimates denoised features (step A07). Then, the discriminator 102 reads denoised features and predicts the probability of it being an originally clean feature vector and also estimates its class label (step A08).

Next, Objective function calculator 103 reads outputs of discriminator and the ground truth class labels and clean features corresponding to the input feature vectors and calculates generator loss (step A09). Next, the parameter updater 104 updates parameter of generator to optimize objection function (step A10).

Next, the parameter updater 104 determines whether or not the generator loss has converged (step A11). The training of generator and discriminator goes on until convergence of generator loss. If the result of the determination in step All is that the generator loss has not converged, step A01 will be executed again. However, if the result of the determination in step All is that the generator loss has converged, the parameter updater 104 stores parameters of the trained feature transformer in storage 105 (step A12).

Figure 5A:
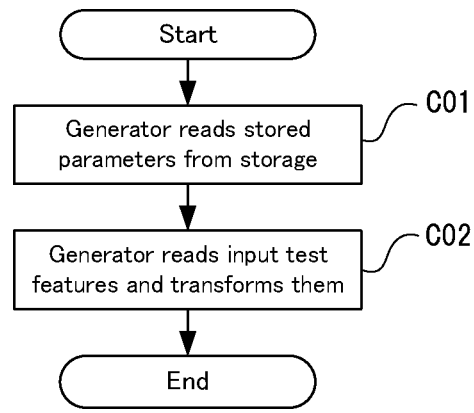
FIG. 5a and 5b are another flowchart showing operations performed by the pattern recognition apparatus according to the first embodiment of the present invention.
Figure 5B:
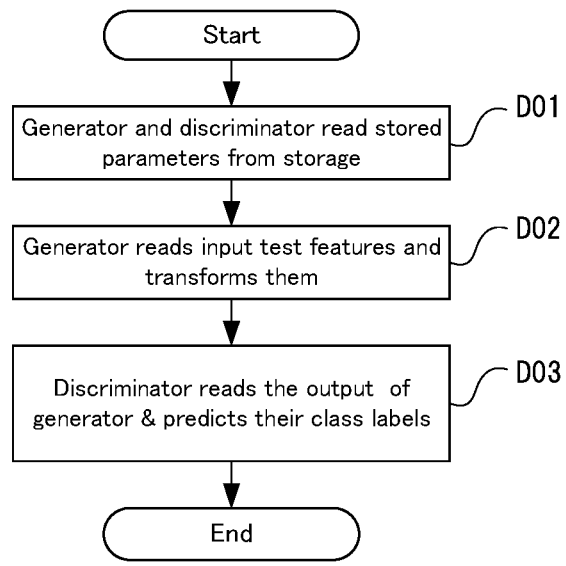

FIG. 5a and 5b are another flowchart showing operations performed by the pattern recognition apparatus according to the first embodiment of the present invention. FIG. 5a and 5b show the two kind of possible testing stage of the first embodiment.

First stage demonstrates feature transformation using trained generator. First, as shown in FIG. 5a, the generator 101 reads its stored structure and parameters from the storage 105 (step C01). Then it reads test features as input and transforms them to produce denoised features as output (step C02). The denoised features can then be given to some classifier to be classified to an appropriate class.

Second stage demonstrates feature transformation and their classification using trained generator and discriminator. First, as shown in FIG. 5b, the generator 101 and the discriminator 102 read their stored structures and parameters from the storage 105 (step D01). Then the generator 101 reads test features as input and transforms them to produce denoised features as output (step D02). Then the discriminator reads the output of generator and estimates their class labels (D03).

Program

It is sufficient that the program of the first embodiment is a program for causing a computer to execute steps A01 to A12 shown in FIG. 4, steps C01 to C02 shown in FIG. 5a and steps D01 to D03 shown in FIG. 5b. The pattern recognition apparatus 100 and the pattern recognition method of the first embodiment can be realized by the program being installed in the computer and executed. In this case, a processor of the computer functions as and performs processing as the generator 101, the discriminator 102, the objective function calculator 103, and the parameter updater 104.

Note that the program of the first embodiment may be executed by a computer system that is constituted by multiple computers. In this case, the computers may respectively function as the generator 101, the discriminator 102, the objective function calculator 103, and the parameter updater 104, for example.

Second Embodiment

Next, a pattern recognition apparatus, a pattern recognition method, and a pattern recognition program of a second embodiment of the present invention will be described with reference to FIGS. 6 to 9.

Device Configuration

Figure 6:
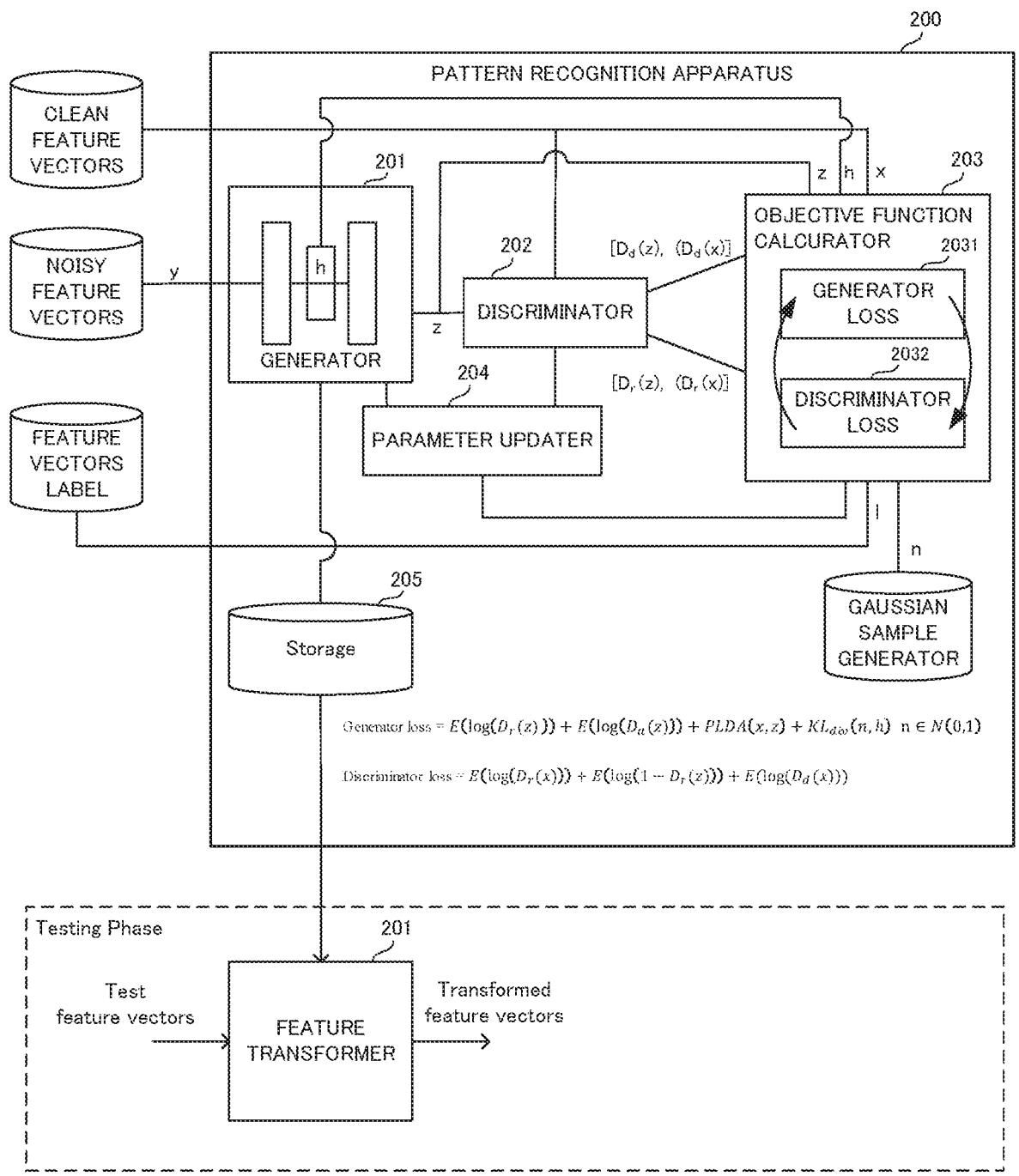
FIG. 6 illustrates a block diagram showing the specific configuration of the pattern recognition apparatus according to the second embodiment of the present invention.

First, the pattern recognition apparatus of the second embodiment will be described with FIG. 6. FIG. 6 illustrates a block diagram showing the specific configuration of the pattern recognition apparatus according to the second embodiment of the present invention. According to the FIG. 6, the pattern recognition apparatus 200 of the second embodiment includes a generator 201, a discriminator 202, an objective function calculator 203 which calculates generator loss 2031 while training the generator and calculates discriminator loss while training the discriminator, a parameter updater 204, a storage 205 of parameters and structures of generator and trained generator 201 in transformation phase.

In the training phase, the generator 201 reads noisy features (y) and estimates denoised features (z). Then, the discriminator 202 reads denoised features (z) and predicts the probability of it being an originally clean feature vector ($D_r(z)$) and also estimates its class label ($D_d(z)$). Then, the discriminator 102 reads original clean features (x) and predicts the probability of it being an originally clean feature vector ($D_r(x)$) and also estimates its class label ($D_d(x)$).

Objective function calculator 103 reads outputs of discriminator ($D_r(x)$, ($D_r(z)$) and ($D_d(x)$, $D_d(z)$) and the ground truth class labels (l) of the input feature vectors and calculates discriminator loss 1032. The mathematical composition of discriminator loss for the primary embodiment is expression 3.

Discriminator loss=$-E(\log(D_r(x)))-E(\log(1-D_r(z)))-E(\log(D_d(x)))$ [Expression 3]

The parameter updater 104 updates parameter of discriminator to optimize objection function. This training of discriminator goes on for a sufficient number of iterations. After the training of discriminator, the generator 101 reads the noisy features and estimates denoised features. Then, discriminator 102 reads denoised features (y) and predicts the probability of it being an originally clean feature vector ($D_r(z)$) and also estimates its class label ($D_d(z)$).

The objective function calculator 103 reads outputs of discriminator ($D_r(z)$) and ($D_d(z)$) and the ground truth class labels (l,x) of the input feature vectors and calculates generator loss 1033. The mathematical composition of generator loss for the primary embodiment is expression 4.

Generator loss=$-E(\log(D_r(z)))-E(\log(D_d(z)))-$PLDA$(x,z)-KL\_div(h,n)$ [Expression 4]

In expression 4, PLDA represents a trained PLDA on clean data and PLDA (x,z) represents output score of PLDA for the test pair of (x,z) and KL_div(h,n) represents KL divergence between the bottle-neck-feature of generator (h) and a random variable (n) having some pre-defined probabilistic distribution.

In the second embodiment, Gaussian distribution is assumed as the pre-defined probabilistic distribution. The parameter updater 104 updates parameter of generator to optimize objection function. The training of generator and discriminator goes on until convergence of generator loss. After the convergence, parameter updater stores parameters of the trained feature transformer in storage 105.

In the testing phase, generator 101 reads its stored structure and parameters from the storage 105. It reads testing features as input and produces denoised features as output.

Figure 7:
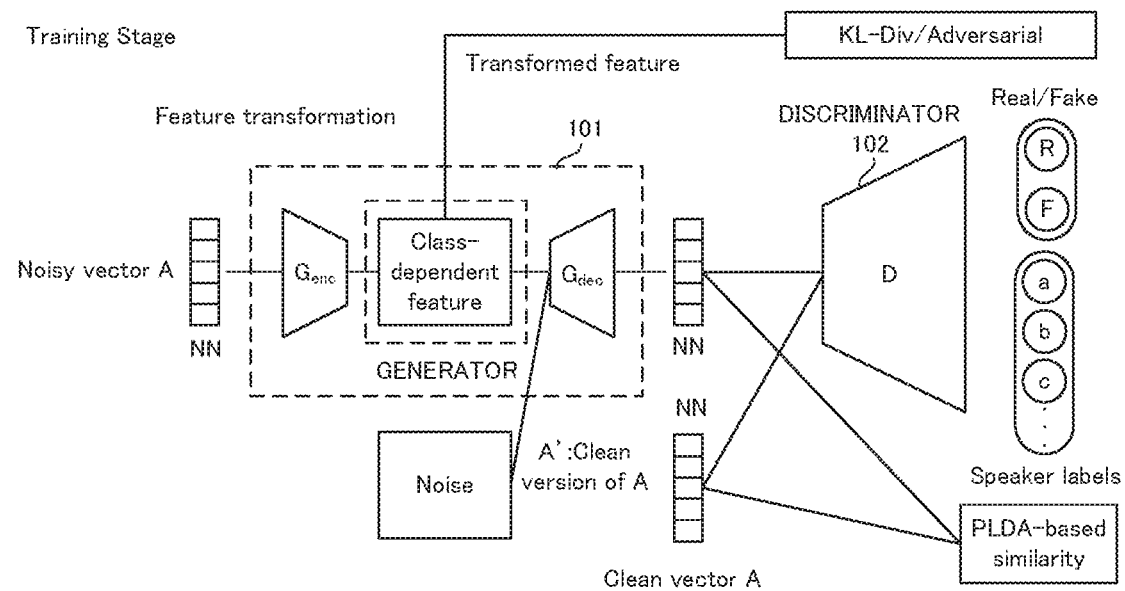
FIG. 7 is a neural network representation illustrating an example of secondary embodiment of the present invention in training phase: training a generator and a discriminator.
Figure 7:
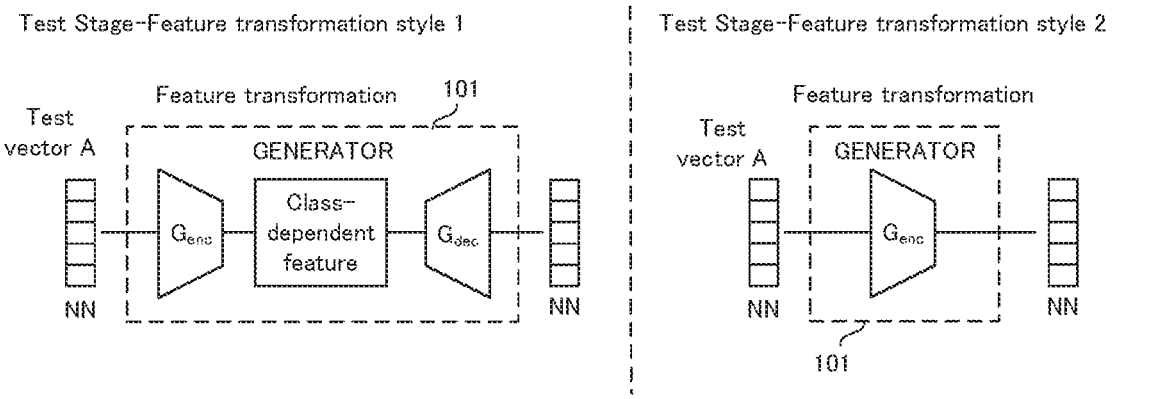

Advantageous effect of the second embodiment in addition to those presented in the first embodiment is: Transformed features have been explicitly trained to follow a pre-defined probabilistic distribution with the help of KL divergence minimization FIG. 7 is a neural network representation illustrating an example of secondary embodiment of the present invention in training phase: training a generator and a discriminator. As shown in the FIG. 7, the generator 201 has two neural network (NNs) as: Encoder ($G_{ene}$) and Decoder ($G_{dec}$). In training stage, $G_{ene}$ reads noisy features as input, encode them into class-dependent features (f), then $G_{dec}$ reads the encoded features (f) and a random noise vector (N) and produces a denoised feature vector A' at output.

The discriminator 202 has one neural network (NN). The discriminator 202 reads the denoised feature vectors (A') and the corresponding clean features (A) and then predicts the probability of each being the originally clean feature vector and estimates the class of each input feature. Also in each training iteration, PLDA similarity is computed between denoised feature vector (A') and the clean feature vector (A) as a measure to find class-oriented similarity between the two features. Additionally, a KL-divergence calculator calculates the divergence of the distribution of encoded feature (f) from a prior defined distribution for e.g. a normal distribution ~N(0,1).

Both generator and discriminator neural networks (NNs) are trained alternatively to optimize generator and discriminator losses such that after the training discriminator can correctly classify denoised features into their classes and cannot distinguish between original clean features (A) and denoised features (A').

Also, after training, the PLDA similarity between every training pair of (A, A') is maximum implying that denoised features have class-related properties and the distribution of encoded features is close to the prior defined distribution. After convergence of the training losses of both the generator 201 and the discriminator 202, the trained weight parameters of both the discriminator 201 and the generator 202 are stored in the storage 205 as described in the block diagram of first embodiment.

There are two types of feature transformation in the trained network. During first style of test stage, the generator 201's neural networks reads its trained parameters from the storage 205, then $G_{ene}$ reads given test feature vector as input and transforms it to encoded feature vector as the output. In second style of test stage, $G_{dec}$ reads the output of $G_{ene}$ (encoded feature vector) as input and produces denoised representation of the input feature.

Device Operation

Next, operations performed by the pattern recognition apparatus 200 of the second embodiment will be described with reference to FIG. 8 and FIG. 9. FIGS. 1 to 3 will be referenced as necessary in the following description. Also, in the second embodiment, a pattern recognition method is implemented by causing the pattern recognition apparatus to operate. Accordingly, the following description of operations performed by the pattern recognition apparatus 200 will substitute for a description of the pattern recognition method of the present second embodiment.

Figure 8:
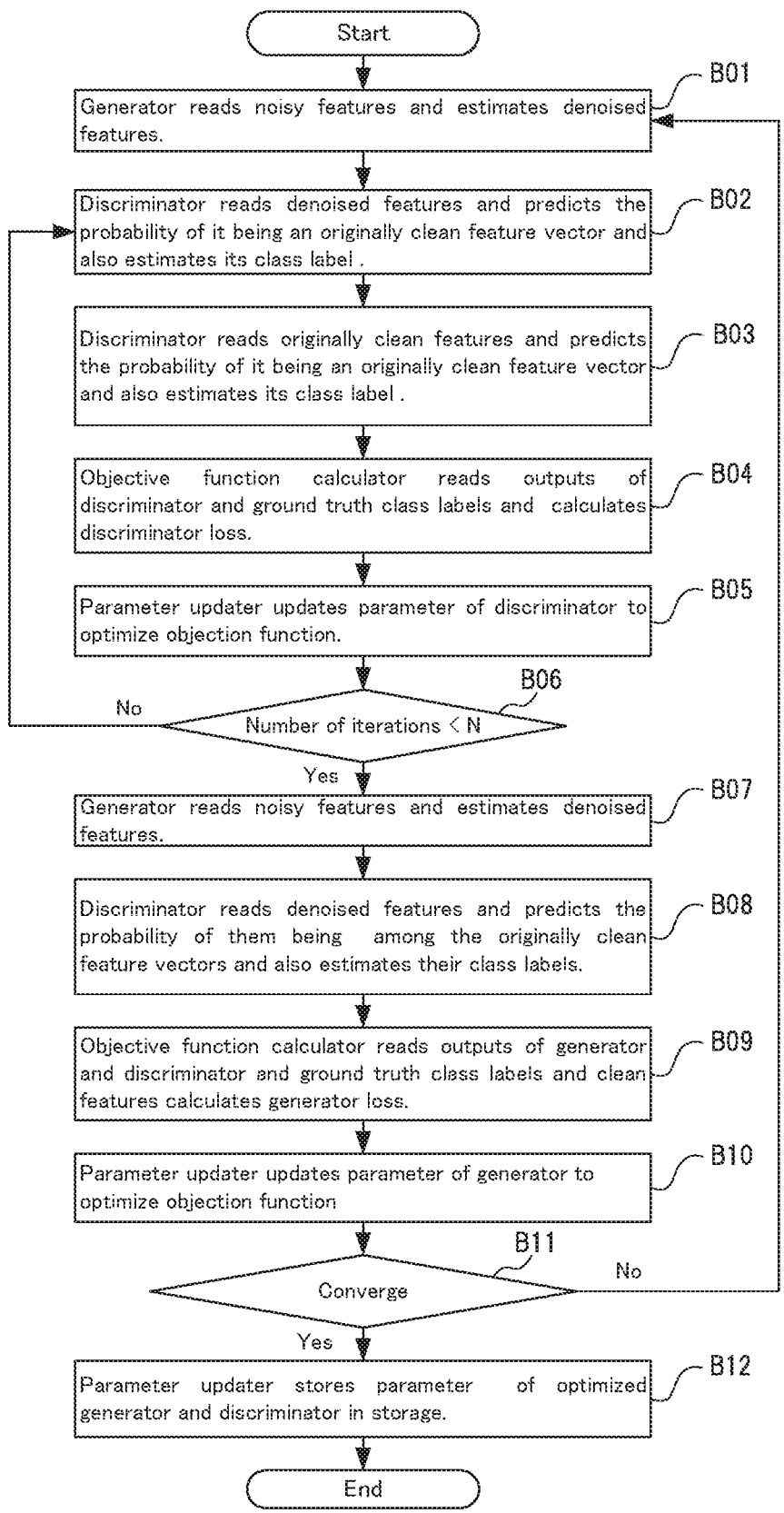
FIG. 8 is a flowchart showing operations performed by the pattern recognition apparatus according to the second embodiment of the present invention.

FIG. 8 is a flowchart showing operations performed by the pattern recognition apparatus according to the second embodiment of the present invention. FIG. 8 shows the training part of the second embodiment. First, as shown in FIG. 8, in the training phase, the generator 201 reads noisy features and estimates denoised features (step B01). Then, the discriminator 202 reads denoised features and predicts the probability of it being an originally clean feature vector and also estimates its class label (step B02).

Then, the discriminator 202 reads original clean features and predicts the probability of it being an originally clean feature vector and also estimates its class label (step B03). Next, the objective function calculator 103 reads outputs of discriminator and the ground truth class labels of the input feature vectors and calculates discriminator loss (step B04).

Next, the parameter updater 204 updates parameter of discriminator to optimize objection function (step B05). Then, the parameter updater 204 determines whether or not number of iterations are smaller than N (step B06). This training of discriminator goes on for a sufficient number of iterations.

If the result of the determination in step B06 is that the number of iterations are not smaller than N, step B02 will be executed again. However, if the result of the determination in step B06 is that the number of iterations are smaller than N, step B07 will be executed.

After the training of discriminator 202, the generator 201 reads the noisy features and estimates denoised features (step B07). Then, the discriminator 102 reads denoised features and predicts the probability of it being an originally clean feature vector and also estimates its class label (step B08).

Next, Objective function calculator 203 reads outputs of discriminator and the ground truth class labels and clean features corresponding to the input feature vectors and calculates generator loss (step B09). Next, the parameter updater 204 updates parameter of generator to optimize objection function (step B10).

Next, the parameter updater 204 determines whether or not the generator loss has converged (step B11). The training of generator and discriminator goes on until convergence of generator loss. If the result of the determination in step B11 is that the generator loss has not converged, step B01 will be executed again. However, if the result of the determination in step B11 is that the generator loss has converged, the parameter updater 204 stores parameters of the trained feature transformer in storage 205 (step B12).

Figure 9A:
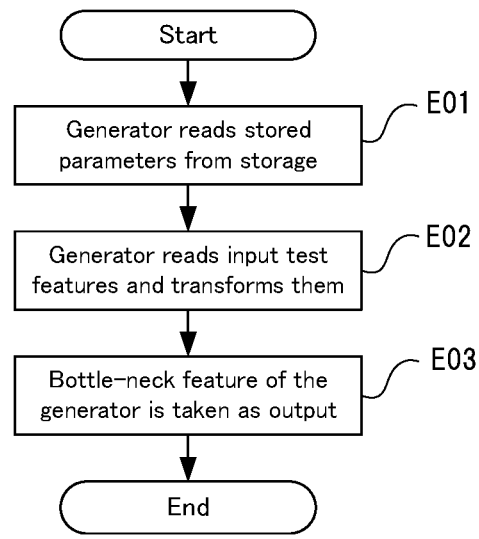
FIG. 9a and 9b are another flowchart showing operations performed by the pattern recognition apparatus according to the second exemplar embodiment of the present invention.
Figure 9B:
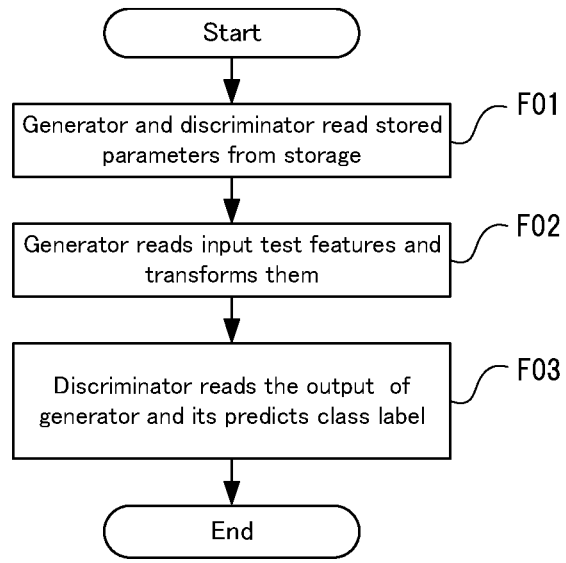

FIG. 9a and 9b are another flowchart showing operations performed by the pattern recognition apparatus according to the second exemplar embodiment of the present invention. FIG. 9a and 9b show the two kind of possible testing stage of the second embodiment.

First stage demonstrates feature transformation using bottle-neck-features of the trained generator. First, as shown in FIG. 9a, the generator 201 reads its stored structure and parameters from the storage 205 (step E01). Then it reads test features as input and transforms them (E02). Then the bottle-neck-features of the generator are taken as the denoised features as output (E03). The denoised features can then be given to some classifier to be classified to an appropriate class.

Second stage demonstrates feature transformation and their classification using trained generator and discriminator. First, as shown in FIG. 9b, the generator 201 and discriminator 202 read their stored structures and parameters from the storage 205 (step F01). Then the generator 201 reads test features as input and transforms them to produce denoised features as output (step F02). Then the discriminator reads the output of generator and estimates their class labels (step F03).

Program

It is sufficient that the program of the second embodiment is a program for causing a computer to execute steps B01 to B12 shown in FIG. 8, steps E01 to E03 shown in FIG. 9a and steps F01 to F03 shown in FIG. 9b. The pattern recognition apparatus 100 and the pattern recognition method of the first embodiment can be realized by the program being installed in the computer and executed. In this case, a processor of the computer functions as and performs processing as the generator 201, the discriminator 202, the objective function calculator 203, and the parameter updater 204.

Note that the program of the second embodiment may be executed by a computer system that is constituted by multiple computers. In this case, the computers may respectively function as the generator 201, the discriminator 202, the objective function calculator 203, and the parameter updater 204, for example.

Physical Configuration

Figure 10:
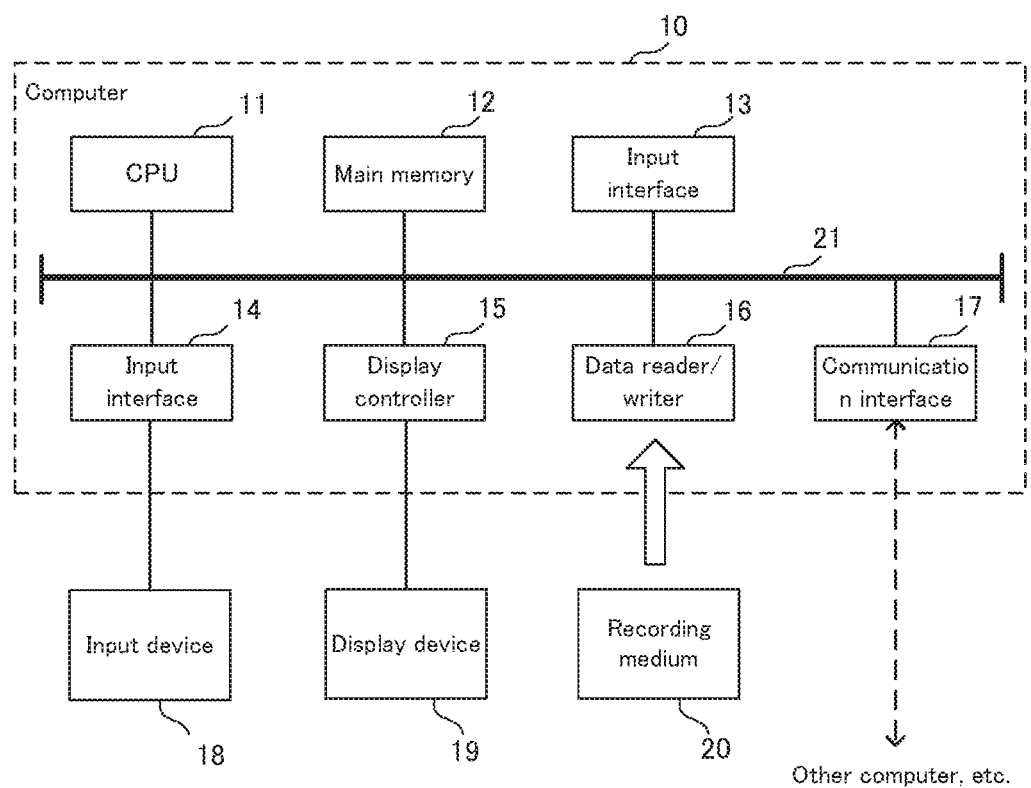
FIG. 10 is a block diagram showing an example of a computer that realizes the pattern recognition apparatus according to the first or second embodiment of the present invention.
Figure 11:
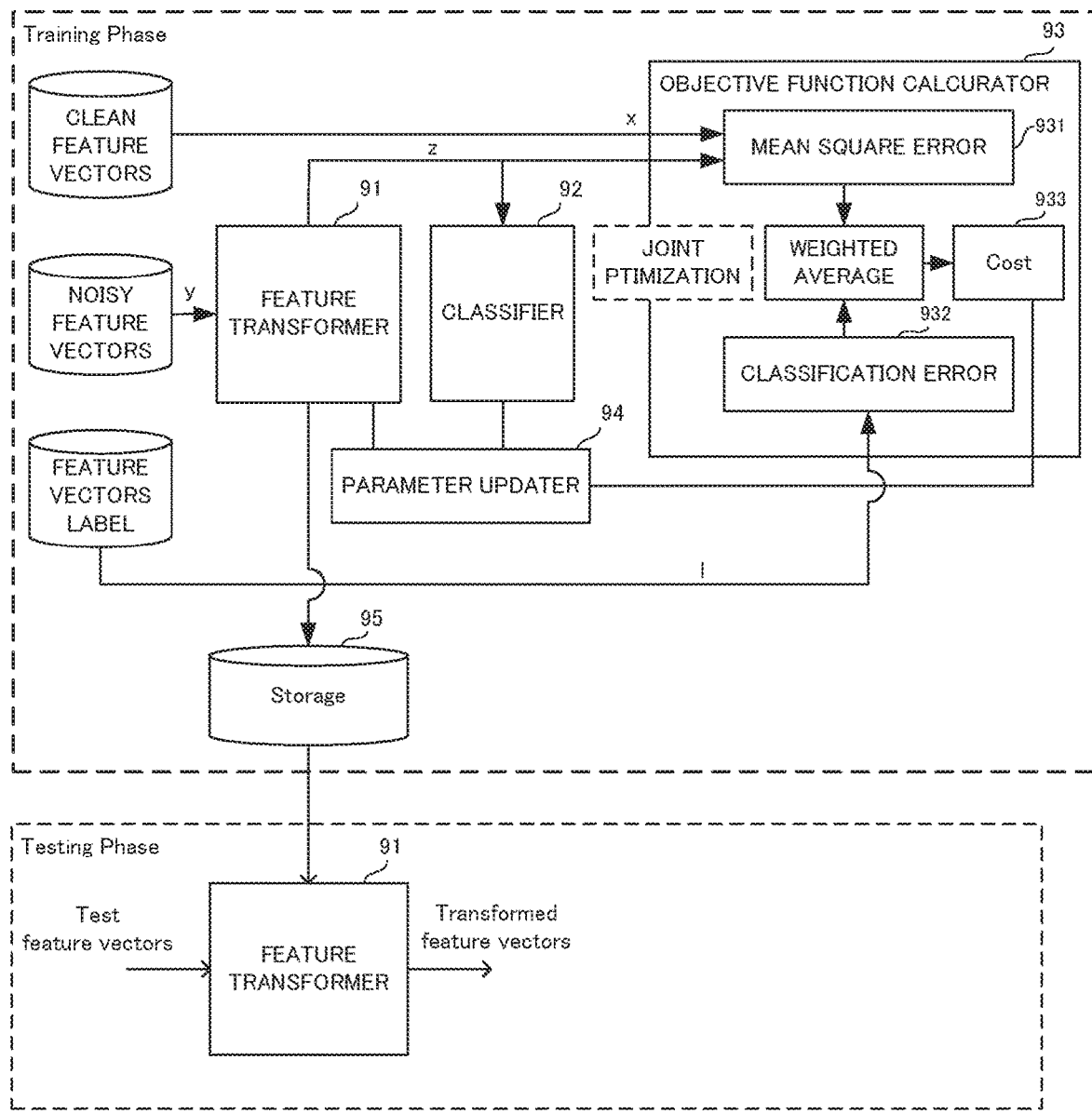
FIG. 11 is a block diagram of prior art 1—Denoising of features using discriminative denoising autoencoder.

The following describes a computer that realizes the pattern recognition apparatus by executing the program of the first or second embodiment, with reference to FIG. 10. FIG. 10 is a block diagram showing an example of a computer that realizes the pattern recognition apparatus according to the first or second embodiment of the present invention.

As shown in FIG. 10, a computer 10 includes a CPU (Central Processing Unit) 11, a main memory 12, a storage device 13, an input interface 14, a display controller 15, a data reader/writer 16, and a communication interface 17. These units are connected by a bus 21 so as to be able to communicate with each other.

The CPU 11 deploys programs (code) of this embodiment, which are stored in the storage device 13, to the main memory 12, and executes various types of calculation by executing the programs in a predetermined order. The main memory 12 is typically a volatile storage device such as a DRAM (Dynamic Random-Access Memory). The programs of this embodiment are provided in a state of being stored in a computer-readable recording medium 20. Note that the programs of this embodiment may be distributed over the Internet, which is accessed via the communication interface 17.

Other specific examples of the storage device 13 include a hard disk and a semiconductor storage device such as a flash memory. The input interface 14 mediates the transfer of data between the CPU 11 and an input device 18 such as a keyboard or a mouse. The display controller 15 is connected to a display device 19, and controls screens displayed by the display device 19.

The data reader/writer 116 mediates the transfer of data between the CPU 11 and the recording medium 20, and executes the readout of programs from the recording medium 20, and the writing of processing results obtained by the computer 10 to the recording medium 20. The communication interface 17 mediates the transfer of data between the CPU 11 and another computer.

Specific examples of the recording medium 20 include a general-purpose semiconductor storage device such as a CF (Compact Flash (registered trademark)) card or an SD (Secure Digital) card, a magnetic storage medium such as a Flexible Disk, and an optical storage medium such as a CD-ROM (Compact Disk Read Only Memory).

Note that the pattern recognition apparatus of the above embodiments can also be realized by using hardware that corresponds to the various units, instead of a computer in which a program is installed. Furthermore, a configuration is possible in which a portion of the pattern recognition apparatus is realized by a program, and the remaining portion is realized by hardware.

Part or all of the embodiments described above can be realized by Supplementary Notes 1 to 27 described below, but the present invention is not limited to the following descriptions.

Supplementary Note 1

A pattern recognition apparatus for pattern recognition using neural network-based feature transformation comprising:

a generator that transforms noisy feature vectors into denoised feature vectors;

a discriminator that takes the denoised feature vectors and the original clean feature vectors corresponding to the denoised feature vectors as input and predicts probability for both of the input features for being an original clean feature, and classifies the input feature vectors into its corresponding classes;

an objective function calculator that calculates generator and discriminator losses using the denoised feature vectors, the clean feature vectors from which the noisy feature vectors have been made, the estimated classes and their true classes wherein the generator loss comprises 1. GAN-based loss, 2. Classification loss, 3. Class-oriented dissimilarity loss, and the discriminator loss comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and a parameter updater that updates parameters of the generator and the discriminator according to loss minimization.

Supplementary Note 2

The pattern recognition apparatus according to supplementary note 1,

Where in the generator loss has one more component of a KL-divergence based regularizer that compares the distribution of bottle-neck-features of the generator with a predefined probabilistic distribution for the encoded input features by the encoder structure of generator.

Supplementary Note 3

The pattern recognition apparatus according to supplementary note 1,

Where the training data also includes pairs of noisy and clean features belonging to two different classes, and in such condition, the third component of generator loss is modified by adding one more component of increasing class oriented dissimilarity for the pair of features belonging to different classes.

Supplementary Note 4

The pattern recognition apparatus according to supplementary note 2,

Where the training data also includes pairs of noisy and clean features belonging to two different classes. And in such condition, the third component of generator loss is modified by adding one more component of increasing class oriented dissimilarity for the pair of features belonging to different classes.

Supplementary Note 5

The pattern recognition apparatus according to supplementary note 1,

Where in the generator act as a feature transformer and further transforms an unseen new test feature vector into a denoised feature vector using the updated parameters for the feature transformer.

Supplementary Note 6

The pattern recognition apparatus according to supplementary note 2,

Wherein the encoder part of the trained generator act as a feature transformer and further transforms an unseen new test feature vector into a denoised feature vector using the updated parameters for the feature transformer.

Supplementary Note 7

The pattern recognition apparatus according to supplementary note 1,

Wherein the classifier part of the discriminator act as a classifier and further classifies an unseen denoised feature vector into a corresponding class using the stored parameters for the discriminator.

Supplementary Note 8

The pattern recognition apparatus according to supplementary note 1,
Wherein the generator is a denoising autoencoder or a siamese network.

Supplementary Note 9

The pattern recognition apparatus according to supplementary note 1,
Wherein the classifier is either of support vector machines with margin error as classification error or neural networks with cross entropy as classification error.

Supplementary Note 10

A pattern recognition method for pattern recognition using neural network-based feature transformation comprising:
(a) a step of transforming noisy feature vectors into denoised feature vectors;
(b) a step of taking the denoised feature vectors and the original clean feature vectors corresponding to the denoised feature vectors as input and predicting probability for both of the input features for being an original clean feature, and classifying the input feature vectors into its corresponding classes;
(c) a step of calculating losses of the step (a) and step (b) using the denoised feature vectors, the clean feature vectors from which the noisy feature vectors have been made, the estimated classes and their true classes wherein the loss of the step (a) comprises 1. GAN-based loss, 2. Classification loss, 3. Class-oriented dissimilarity loss, and the loss of the step (b) comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and
(d) a step of updating parameters of the step (a) and the step (b) according to loss minimization.

Supplementary Note 11

The pattern recognition method according to supplementary note 10,
Where in the loss of the step (a) has one more component of a KL-divergence based regularizer that compares the distribution of bottle-neck-features of the step (a) with a pre-defined probabilistic distribution for the encoded input features by the encoder structure of generator.

Supplementary Note 12

The pattern recognition method according to supplementary note 10,
Where the training data also includes pairs of noisy and clean features belonging to two different classes, and
in such condition, the third component of loss of the step (a) is modified by adding one more component of increasing class oriented dissimilarity for the pair of features belonging to different classes.

Supplementary Note 13

The pattern recognition method according to supplementary note 11,
Where the training data also includes pairs of noisy and clean features belonging to two different classes. And
in such condition, the third component of loss of the step (a) is modified by adding one more component of increasing class oriented dissimilarity for the pair of features belonging to different classes.

Supplementary Note 14

The pattern recognition method according to supplementary note 10,
Wherein in the step (a), further transforming an unseen new test feature vector into a denoised feature vector using the updated parameters for transforming a feature.

Supplementary Note 15

The pattern recognition method according to supplementary note 11,
Wherein in the step (a), transforming the unseen new test feature vector into the denoised feature vector by an encoder.

Supplementary Note 16

The pattern recognition method according to supplementary note 10,
Wherein in the step (b), further classifying an unseen denoised feature vector into a corresponding class using the stored parameters for the discriminator.

Supplementary Note 17

The pattern recognition method according to supplementary note 10,
Wherein in the step (a), transforming noisy feature vectors into denoised feature vectors by a denoising autoencoder or a siamese network.

Supplementary Note 18

The pattern recognition method according to supplementary note 10,
Wherein in the step (b), classifying the input feature vectors into its corresponding classes by either of support vector machines with margin error as classification error or neural networks with cross entropy as classification error.

Supplementary Note 19

A computer-readable medium having recorded thereon a program for pattern recognition using neural network-based feature transformation by a computer, the program including instructions for causing the computer to execute:
(a) a step of transforming noisy feature vectors into denoised feature vectors;
(b) a step of taking the denoised feature vectors and the original clean feature vectors corresponding to the denoised feature vectors as input and predicting probability for both of the input features for being an original clean feature, and classifying the input feature vectors into its corresponding classes;
(c) a step of calculating losses of the step (a) and step (b) using the denoised feature vectors, the clean feature vectors from which the noisy feature vectors have been made, the estimated classes and their true classes wherein the loss of the step (a) comprises 1. GAN-based loss, 2. Classification loss, 3. Class-oriented dissimilarity loss, and the loss of the step (b) comprises 1. GAN-based loss and 2. Classification loss; and the GAN-based loss is calculated with the output probability predicted by the discriminator for the input feature vector to be an originally clean feature vector, the class-oriented dissimilarity loss is the dissimilarity between denoised feature vector produced by the generator and the corresponding clean features measured using pre-trained PLDA-based-scoring; and the classification loss is the prediction error between the estimated class label and corresponding ground truth; and (d) a step of updating parameters of the step (a) and the step (b) according to loss minimization.

Supplementary Note 20

The computer-readable recording medium according to supplementary note 19,

Where in the loss of the step (a) has one more component of a KL-divergence based regularizer that compares the distribution of bottle-neck-features of the step (a) with a pre-defined probabilistic distribution for the encoded input features by the encoder structure of generator.

Supplementary Note 21

The computer-readable recording medium according to supplementary note 19,

Where the training data also includes pairs of noisy and clean features belonging to two different classes, and in such condition, the third component of loss of the step (a) is modified by adding one more component of increasing class oriented dissimilarity for the pair of features belonging to different classes.

Supplementary Note 22

The computer-readable recording medium according to supplementary note 20,

Where the training data also includes pairs of noisy and clean features belonging to two different classes. And in such condition, the third component of loss of the step (a) is modified by adding one more component of increasing class oriented dissimilarity for the pair of features belonging to different classes.

Supplementary Note 23

The computer-readable recording medium to supplementary note 19,

Wherein in the step (a), further transforming an unseen new test feature vector into a denoised feature vector using the updated parameters for transforming a feature.

Supplementary Note 24

The computer-readable recording medium to supplementary note 20,

Wherein in the step (a), transforming the unseen new test feature vector into the denoised feature vector by an encoder.

Supplementary Note 25

The computer-readable recording medium according to supplementary note 19,

Wherein in the step (b), further classifying an unseen denoised feature vector into a corresponding class using the stored parameters for the discriminator.

Supplementary Note 26

The computer-readable recording medium according to supplementary note 19,

Wherein in the step (a), transforming noisy feature vectors into denoised feature vectors by a denoising autoencoder or a siamese network.

Supplementary Note 27

The computer-readable recording medium according to supplementary note 19,

Wherein in the step (b), classifying the input feature vectors into its corresponding classes by either of support vector machines with margin error as classification error or neural networks with cross entropy as classification error.

As a final point, it should be clear that the process, techniques and methodology described and illustrated here are not limited or related to a particular apparatus. It can be implemented using a combination of components. Also various types of general purpose devise may be used in accordance with the instructions herein. The present invention has also been described using a particular set of examples. However, these are merely illustrative and not restrictive. For example the described software may be implemented in a wide variety of languages such as C++, Java, Python and Perl etc. Moreover other implementations of the inventive technology will be apparent to those skilled in the art.

INDUSTRIAL APPLICABILITY

According to the present invention, it is possible to present a feature transformation block in a pattern recognition system with the properties of maintaining class-oriented similarity in transformed features so as to minimize within-class covariance and maximize between-class covariance. The present invention is useful in fields, e.g. face recognition and speaker verification.

REFERENCE SIGNS LIST

10 Computer
11 CPU
12 Main memory
13 Storage device
14 Input interface
15 Display controller
16 Data reader/writer
17 Communication interface
18 Input device
19 Display apparatus
20 Storage medium
21 Bus
100 Pattern recognition apparatus (first embodiment)
101 Generator
102 Discriminator
103 Objective function calculator
104 Parameter updater 105 Storage
200 Pattern recognition apparatus (second embodiment)
201 Generator
202 Discriminator
203 Objective function calculator
204 Parameter updater
205 Storage

What is claimed is:

1. A pattern recognition apparatus for pattern recognition using neural network-based feature transformation comprising:
one or more processors; and
one or more memories storing instructions executable by the one or more processors to:
generate denoised feature vectors by transforming noisy feature vectors into the denoised feature vectors;
discriminate the denoised feature vectors and clean feature vectors corresponding to the denoised feature vectors by predicting probabilities that the denoised feature vectors and clean feature vectors corresponding to the denoised feature vectors are the clean feature vectors, and estimating corresponding classes of the denoised feature vectors and the clean feature vectors;
calculate generator and discriminator losses using the denoised feature vectors, the clean feature vectors corresponding to the noisy feature vectors, the estimated corresponding classes of the denoised feature vectors and the clean feature vectors, and actual corresponding classes of the denoised feature vectors and the clean feature vectors, wherein
the generator loss comprises a Generative Adversarial Network (GAN)-based loss, a classification loss, and a class-oriented dissimilarity loss,
the discriminator loss comprises the GAN-based loss and the classification loss,
the GAN-based loss is calculated using the predicted probabilities that the denoised feature vectors and the clean feature vectors are the clean feature vectors,
the class-oriented dissimilarity loss is a dissimilarity between the denoised feature vectors and the clean features corresponding to the denoised feature vectors as measured using pre-trained probabilistic linear discriminant analysis (PLDA)-based-scoring, and
the classification loss is a prediction error between the estimated corresponding classes of the denoised feature vectors and the clean feature vectors and the actual corresponding classes; and
update parameters used in generation of the denoised feature vectors and in discrimination of the denoised feature vectors and the clean feature vectors, such that the generator loss and the discriminator loss are minimized.

2. The pattern recognition apparatus according to claim 1, wherein the generator loss includes a Kullback-Leibler (KL)-divergence based regularizing component that compares a distribution of bottle-neck-features in generating the denoised feature vectors with a pre-defined probabilistic distribution of encoded input features as encoded using an encoder structure when generating the denoised feature vectors.

3. The pattern recognition apparatus according to claim 1, wherein the noisy feature vectors and the clean feature vectors comprise pairs of the noisy feature vectors and the clean feature vectors belonging to different classes, and
the generator loss is modified by increasing class-oriented dissimilarity for the pairs belonging to the different classes.

4. The pattern recognition apparatus according to claim 2, wherein the noisy feature vectors and the clean feature vectors comprise pairs of the noisy feature vectors and the clean feature vectors belonging to different classes, and
the generator loss is modified by increasing class-oriented dissimilarity for the pairs belonging to the different classes.

5. The pattern recognition apparatus according to claim 1, wherein generation of the denoised feature vectors further transforms a new test feature vector into a corresponding denoised feature vector using the updated parameters.

6. The pattern recognition apparatus according to claim 2, wherein generation of the denoised feature vectors further transforms a new test feature vector into a corresponding denoised feature vector using the updated parameters.

7. The pattern recognition apparatus according to claim 1, wherein discrimination of the denoised feature vectors and the clean feature vectors further classifies a new denoised feature vector into a corresponding class using the updated parameters.

8. The pattern recognition apparatus according to claim 1, wherein generation of the denoised feature vectors uses a denoising autoencoder or a Siamese network.

9. The pattern recognition apparatus according to claim 1, wherein discrimination of the denoised feature vectors and the clean feature vectors uses support vector machines with margin error or neural networks with cross entropy, and uses the margin error or the cross entropy_as classification error.

10. A pattern recognition method for pattern recognition using neural network-based feature transformation, the pattern recognition method performed by a computer and comprising:
generating denoised feature vectors by transforming noisy feature vectors into the denoised feature vectors;
discriminating the denoised feature vectors and clean feature vectors corresponding to the denoised feature vectors by predicting probabilities that the denoised feature vectors and clean feature vectors corresponding to the denoised feature vectors are the clean feature vectors, and estimating corresponding classes of the denoised feature vectors and the clean feature vectors;
calculating generator and discriminator losses using the denoised feature vectors, the clean feature vectors corresponding to the noisy feature vectors, the estimated corresponding classes of the denoised feature vectors and the clean feature vectors, and actual corresponding classes of the denoised feature vectors and the clean feature vectors, wherein
the generator loss comprises a Generative Adversarial Network (GAN)-based loss, a classification loss, and a class-oriented dissimilarity loss,
the discriminator loss comprises the GAN-based loss and the classification loss,
the GAN-based loss is calculated using the predicted probabilities that the denoised feature vectors and the clean feature vectors are the clean feature vectors,
the class-oriented dissimilarity loss is a dissimilarity between the denoised feature vectors and the clean features corresponding to the denoised feature vectors as measured using pre-trained probabilistic linear discriminant analysis (PLDA)-based-scoring, and the classification loss is a prediction error between the estimated corresponding classes of the denoised feature vectors and the clean feature vectors and the actual corresponding classes; and updating parameters used in generation of the denoised feature vectors and in discrimination of the denoised feature vectors and the clean feature vectors, such that the generator loss and the discriminator loss are minimized.

11. The pattern recognition method according to claim 10, wherein the generator loss includes a Kullback-Leibler (KL)-divergence based regularizing component that compares a distribution of bottle-neck-features in generating the denoised feature vectors with a pre-defined probabilistic distribution of encoded input features as encoded using an encoder structure when generating the denoised feature vectors.

12. The pattern recognition method according to claim 10, wherein the noisy feature vectors and the clean feature vectors comprise pairs of the noisy feature vectors and the clean feature vectors belonging to different classes, and the generator loss is modified by increasing class-oriented dissimilarity for the pairs belonging to the different classes.

13. The pattern recognition method according to claim 11, wherein the noisy feature vectors and the clean feature vectors comprise pairs of the noisy feature vectors and the clean feature vectors belonging to different classes, and the generator loss is modified by increasing class-oriented dissimilarity for the pairs belonging to the different classes.

14. The pattern recognition method according to claim 10, wherein generation of the denoised feature vectors further transforms a new test feature vector into a corresponding denoised feature vector using the updated parameters.

15. The pattern recognition method according to claim 11, wherein generation of the denoised feature vectors further transforms a new test feature vector into a corresponding denoised feature vector using the updated parameters.

16. The pattern recognition method according to claim 10, wherein discrimination of the denoised feature vectors and the clean feature vectors further classifies a new denoised feature vector into a corresponding class using the updated parameters.

17. The pattern recognition method according to claim 10, wherein generation of the denoised feature vectors uses a denoising autoencoder or a Siamese network.

18. The pattern recognition method according to claim 10, wherein discrimination of the denoised feature vectors and the clean feature vectors uses support vector machines with margin error or neural networks with cross entropy, and uses the margin error or the cross entropy as classification error.

19. A non-transitory computer-readable medium storing a program for pattern recognition using neural network-based feature transformation, the program executable by a computer to perform:

generating denoised feature vectors by transforming noisy feature vectors into the denoised feature vectors;

discriminating the denoised feature vectors and clean feature vectors corresponding to the denoised feature vectors by predicting probabilities that the denoised feature vectors and clean feature vectors corresponding to the denoised feature vectors are the clean feature vectors, and estimating corresponding classes of the denoised feature vectors and the clean feature vectors;

calculating generator and discriminator losses using the denoised feature vectors, the clean feature vectors corresponding to the noisy feature vectors, the estimated corresponding classes of the denoised feature vectors and the clean feature vectors, and actual corresponding classes of the denoised feature vectors and the clean feature vectors, wherein the generator loss comprises a Generative Adversarial Network (GAN)-based loss, a classification loss, and a class-oriented dissimilarity loss, the discriminator loss comprises the GAN-based loss and the classification loss, the GAN-based loss is calculated using the predicted probabilities that the denoised feature vectors and the clean feature vectors are the clean feature vectors, the class-oriented dissimilarity loss is a dissimilarity between the denoised feature vectors and the clean features corresponding to the denoised feature vectors as measured using pre-trained probabilistic linear discriminant analysis (PLDA)-based-scoring, and the classification loss is a prediction error between the estimated corresponding classes of the denoised feature vectors and the clean feature vectors and the actual corresponding classes; and updating parameters used in generation of the denoised feature vectors and in discrimination of the denoised feature vectors and the clean feature vectors, such that the generator loss and the discriminator loss are minimized.

* * * * *